US005243853A

United States Patent [19]

Steinbrenner et al.

[11] Patent Number: 5,243,853

[45] Date of Patent: Sep. 14, 1993

[54] METHOD AND ARRANGEMENT FOR DIAGNOSING THE OPEN-LOOP CONTROL OF THE TANK-VENTING VALVE IN COMBINATION WITH THE OPEN-LOOP CONTROL OF AN INTERNAL COMBUSTION ENGINE

[75] Inventors: Ulrich Steinbrenner; Helmut Denz, both of Stuttgart; Günther Plapp, Filderstadt; Ulrich Mayer, Waiblingen; Wolfgang Wagner, Korntal-Münchingen; Stephan Höhne, Bietigheim, all of Fed. Rep. of Germany

[73] Assignee: Robert Bosch GmbH, Stuttgart, Fed. Rep. of Germany

[21] Appl. No.: 773,564

[22] PCT Filed: Mar. 23, 1990

[86] PCT No.: PCT/DE90/00231

§ 371 Date: Nov. 4, 1991

§ 102(e) Date: Nov. 4, 1991

[87] PCT Pub. No.: WO90/13738

PCT Pub. Date: Nov. 15, 1990

[30] Foreign Application Priority Data

May 2, 1989 [DE] Fed. Rep. of Germany ....... 3914536

[51] Int. Cl.[5] .......... G01M 15/00

[52] U.S. Cl. .......... 73/117.3; 73/118.1

[58] Field of Search .......... 73/117.2, 117.3, 118.1

[56] References Cited

U.S. PATENT DOCUMENTS 4,402,217 9/1983 Higashiyama .......... 73/117.3

4,467,769 8/1984 Matsumura .

4,794,790 1/1989 Margarit-Metaxa et al. .

*Primary Examiner*—Robert Raevis

*Attorney, Agent, or Firm*—Walter Ottesen

[57] ABSTRACT

A method is introduced of checking the drivability of a tank-venting valve (TEV) and of an idle actuator.

After actuating the TEV, an additional air/fuel mixture is supplied to the intake region of an internal combustion engine having an air/fuel ratio which can be equal to that at which the engine usually operates ($\lambda_0$) or greater or less than $\lambda_0$. Reactions of a λ-control and/or of an idle control can be evaluated in dependence thereon. It is advantageous that a check is made independently of how intense the additional air/fuel mixture is enriched with fuel.

8 Claims, 3 Drawing Sheets

METHOD AND ARRANGEMENT FOR DIAGNOSING THE OPEN-LOOP CONTROL OF THE TANK-VENTING VALVE IN COMBINATION WITH THE OPEN-LOOP CONTROL OF AN INTERNAL COMBUSTION ENGINE

FIELD OF THE INVENTION

The invention relates to a diagnostic method for checking actuating elements of the closed-lop and/or open-loop control of operating parameters in combination with the idle control and the tank venting for internal combustion engines having an electronics control unit. During the operation of an internal combustion engine, it is known to trap gasoline vapors escaping from the tank primarily for reasons of environmental protection. This usually takes place with the aid of an activated-carbon filter which is flushed into the intake region of the engine via an assigned tank-venting valve (TEV) by means of a correspondingly clocked drive In this way, an additional air-quantity flow is supplied to the engine. The fuel component in the regenerating gas flow is adapted. The fuel quantity supplied to the engine is correspondingly reduced. For this reason, it is conventional to introduce a so-called mixture-adaptation inhibit during the tank-venting phases in order to prevent the occurrence of mis-adaptation and falsification in the characteristic fields of the learning systems because of tank-venting quantities which are difficult to detect.

BACKGROUND OF THE INVENTION

A diagnostic method for quantitatively checking actuating elements in internal combustion engines (U.S. Pat. No. 4,794,790) is known for which however a diagnosis is only then possible when the regenerating gas flow contains so little fuel that practically no additional fuel quantity results when a regenerating gas flow is supplied via the tank-venting valve.

Accordingly, it is an object of the invention to provide an appropriate diagnostic method which permits such actuators to be checked independently of the air/fuel ratio of the regenerating flow during operation.

SUMMARY OF THE INVENTION

The invention affords the advantage relative to what is known in that a check of the tank-venting valve can take place independently as to how much the activated carbon filter taking up the fuel vapors is saturated. For this reason, this check can be made any time during idle operation independently of how long the engine has already been in operation.

A check is also possible at any time in a service station. It is conceivable that this check can be carried out by a suitable test program or also by manual intervention from the outside. In addition, the diagnostic method presented here affords the advantage that no additional sensors are needed therefor. Precisely these sensors cause relatively high cost with the corresponding circuitry and present additional sources of error. This means that the suggested diagnostic method operates economically.

When the air/fuel ratio of the regenerating gas flow is equal to or greater than the air-fuel ratio at which the engine usually operates ($\lambda_0$), then, for example, further test cycles can be carried out on the same basis in such a manner that a check of the idle actuator can be carried out in addition to the check of the tank-venting valve. The value of $\lambda_0$ usually lies at 1. A $\lambda_0>1$ is as a rule required for lean engines.

BRIEF DESCRIPTION OF THE DRAWINGS

Embodiments of the invention are shown in the drawing and will be more carefully described in the following description.

DESCRIPTION OF THE PREFERRED EMBODIMENTS OF THE INVENTION

The basic idea of the present invention is to carry out an actuator element diagnosis for the area of tank venting during operation of a motor vehicle and while the engine is running and for which an actual physical feedback reaction results independently of the air/fuel ratio of the regenerating gas flow. The diagnosis is based upon that enriched air is conducted into the intake pipe of the engine via the tank-venting system and that, for this reason, engine reactions occur which are registered by corresponding sensors and are compared with pregiven values which are stored or computed. In this way, corresponding fault conditions can be identified.

Before the invention is considered in depth below, it is expressly noted that the block circuit diagram shown in FIG. 1 and showing the invention with respect to discrete circuit stages does not limit the invention but instead especially operates to make clear the functional basic operations of the invention and to show special operating sequences in a possible realization. It is understood that the individual components and blocks can be built up in analog, digital or hybrid technology. Furthermore, it is also possible that they can be entirely or partially grouped together and include, for example, areas of program-controlled digital systems such as microcomputers, microprocessors, digital or analog logic circuits and the like. The descriptions provided below are therefore only to be taken as a preferred embodiment with reference to functional overall and time sequence which evaluate the operation obtained with the particular block discussed and with reference to the particular cooperation of the component functions illustrated by the individual components with the suggestions as to the particular circuit blocks being given for a better understanding. Furthermore, it is noted that the open-loop control of the idle gas flow does of course not necessarily have to take place via a bypass line. In lieu thereof, an idle actuator is possible which itself controls the throttle flap. Since no further discussion is provided with respect to this possibility in the further description, the idle actuator element provided therefor is shown only in phantom outline in FIG. 1.

Figure 1:
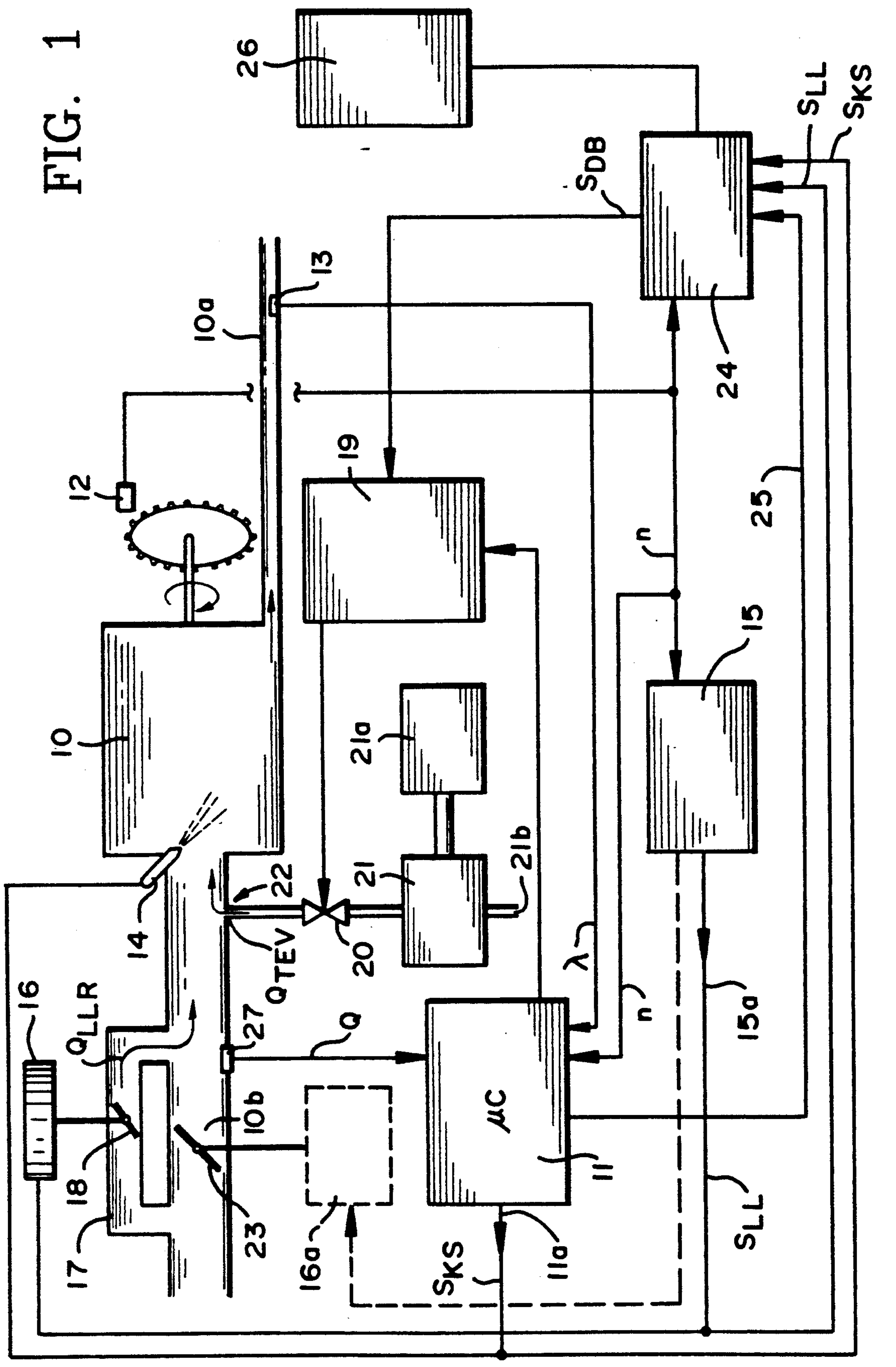
FIG. 1 is a simplified schematic in the form of a block circuit diagram showing a possible realization of electronic, electrical and electro-mechanical closed-loop and open-loop elements as well as actuating elements for the operation of an engine with especially the regions of idle control as well as tank venting being presented.

In FIG. 1, the engine is identified by 10 with the exhaust channel thereof being identified by 10*a* and the intake pipe or the intake region being identified by 10*b*.

The other components which carry out the operation of the engine are discussed only to the extent that this is necessary for an understanding of the present invention and for the basic interrelationships.

An electronic open-loop control unit is usually a microcomputer having the following: a microprocessor, a memory assigned thereto, current supply and peripheral transducers as well as actuating elements The electronic open-loop control unit receives operating condition data and at least the following: the load Q of the engine 10 via an air-flow sensor 27 which is mounted in the intake pipe 10*b* and which can be an air-flow sensor plate, a pressure sensor, a hot-wire air-flow sensor or the like; the engine speed (n) from an engine-speed transducer 12 which inductively senses the teeth of a toothed wheel driven by the engine; and, the output signal of a lambda probe 13 which is mounted in the exhaust-gas channel and, when the engine 10 is viewed as a closed-loop control segment, provides an actual-value input with respect to the particular operating condition, more specifically, the oxygen content of the exhaust gas.

From this data and a plurality of further information supplied such as temperature, air pressure and the like, the microcomputer produces an output signal computed with great accuracy, in a fuel-injection apparatus, for example, an injection control command ti for driving injection valves symbolically illustrated with 14 in the intake region.

Circuit blocks or control units can be provided separately for the operation of the engine in idle in that an idle air controller 15 determines a control difference from the actual speed of the engine and a pregiven desired value and supplies an actuator element 16 which, for example, can be a so-called two-winding rotation actuator and can appropriately displace an idle air flap 18 in a bypass 17 to a throttle flap 23.

Finally, a control unit 19 is provided for tank venting and is drawn separately for clarity. The control unit 19 could however also be a part of the central microcomputer and drives the tank-venting valve 20 which connects the outlet of an active carbon filter 21 to the intake region of the engine 10. The opening into the intake pipe is arranged at 22 and behind the air-flow sensor 27. The active carbon filter is assigned to a fuel tank 21*a*. The active carbon filter has an opening 21*b* through which the air for regenerating the filter enters.

For carrying out the diagnostic method according to the invention, a further diagnostic block 24 is provided which is shown separately in FIG. 1 but could also be part of the central microcomputer. This diagnostic block supplies a signal (SDB) via a signal line to the tank-venting control unit 19 by means of which the conventional tank-venting function can be disabled and by means of which the diagnostic method is initiated. That is, this diagnostic method is separate from the tank-venting function or is possible also during operation of the tank-venting function.

The diagnostic block 24 also receives: the output signal of the measuring unit corresponding to the lambda probe via a signal line 25; a closure signal $S_{LL}$ via the idle controller 15; a control signal $S_{KS}$ for the supply of fuel via the electronic control unit 11 as well as a measurement signal of the engine-speed transducer 12.

The diagnostic unit can be part of the microcomputer or of its program and includes comparison means which can carry out the required comparisons of measurement signals.

A display device 26 can also be driven by the diagnostic block 24. The display device 24 permits indicating lamps to illuminate in accordance with the results of the diagnosis. It is understood that this display can basically have any desired form and can be realized as a digital display and can also display intermediate values of the diagnosis.

The air quantity which is supplied to the engine when the throttle flap is closed comprises two main components, namely: (a) the air quantity supplied via the idle air flap 18; and, (b) the air quantity which is supplied via the tank-venting valve (possibly only intermittently) and which is not detected by the air-flow sensor 27.

First, the premise is set that the idle control is operational; that is, that the speed of the engine is continuously monitored and a slight deviation of the engine speed (which is hardly noticeable by the driver) leads to a correction via the position of the idle air flap 18.

A further premise is that the engine operates in idle during the duration of the diagnosis and the throttle flap 23 remains closed during this time.

At this point, it is again noted that the control of the idle gas flow must not take place via a bypass. If this control takes place via the positioning of the throttle flap 23 by means of an idle actuator 16*a*, the throttle flap 23 can of course not be fully closed during idle operation; instead, the required idle air must be supplied.

Figure 2:
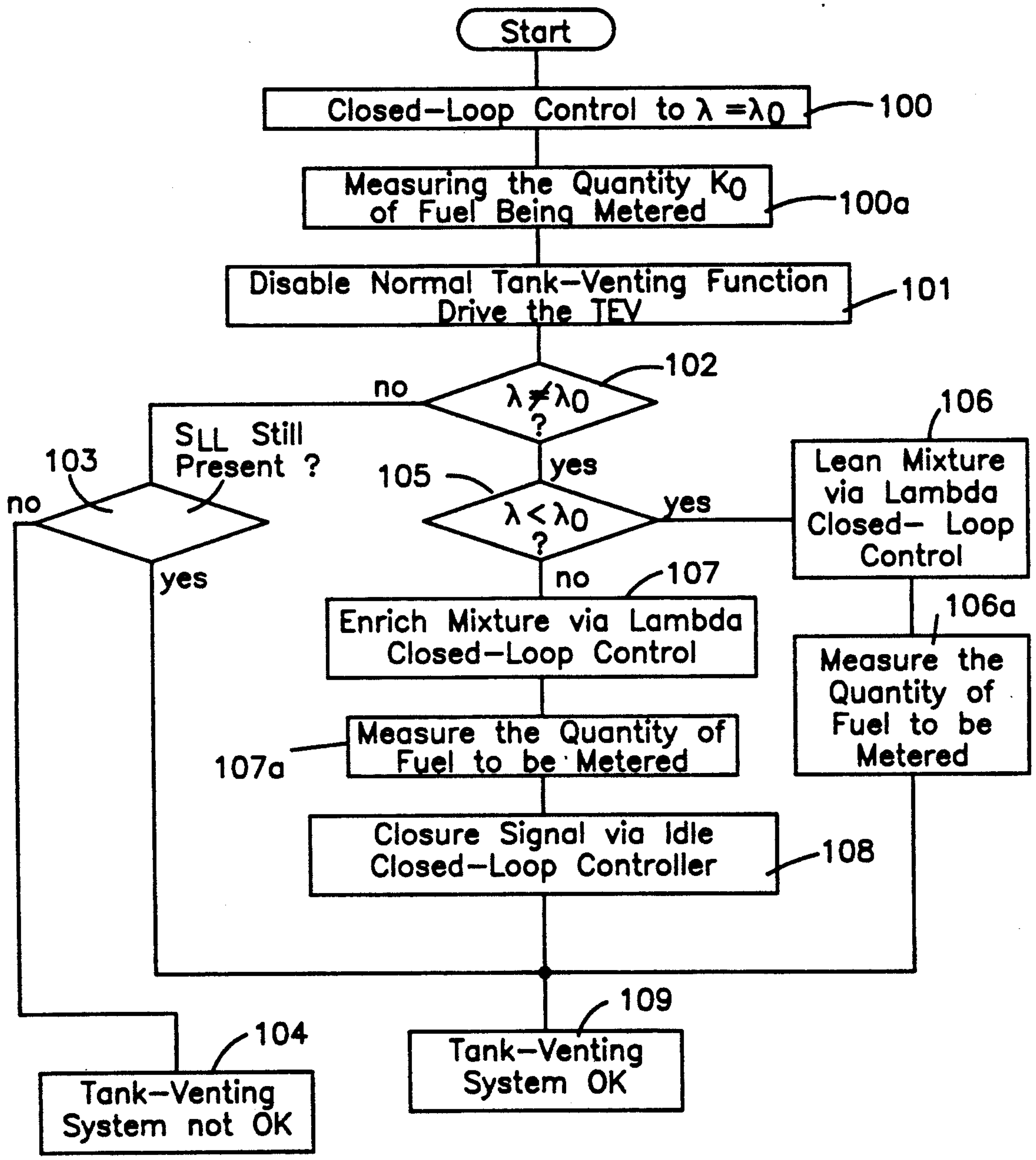
FIG. 2 shows a flowchart of the diagnostic method for checking the tank-venting system; and, FIG. 3 shows the flowchart of the diagnostic method for checking the tank-venting system and the idle open-loop control system.

With the above presumptions, a first variant of the diagnostic method according to the invention results in accordance with the flowchart of FIG. 2 as follows.

The lambda control controls the air/fuel mixture in step 100 so that the value ($\lambda_0$) is reached which is required for the operation of the engine. This value as a rule lies at $\lambda_0=1$; however, values deviating from 1 are also conceivable such as for lean engines for which usually $\lambda_0>1$ is required.

After a possible determination of the fuel quantity k to be supplied per cylinder charge (100*a*), the tank-venting valve 20 is charged with an opening signal controlled via the diagnostic unit 24 which is in addition to the normal tank-venting function or after switchoff of the tank-venting function. In this way, for the normal condition, an additional air/fuel mixture reaches the intake pipe 10*b*. This air/fuel ratio can be equal to $\lambda_0$ or be less or greater than $\lambda_0$ and is dependent upon how the active carbon filter is charged with fuel. At step 102, an inquiry takes place as to whether the actual air number, which is determined via the lambda probe 13 and the measuring unit assigned thereto, is equal to the original $\lambda_0$.

If this is the case, then it follows that an air/fuel mixture of $\lambda=\lambda_0$ flows from the active carbon filter 21. Because of the larger mixture quantity, the engine reacts with a higher engine speed. As a consequence thereof, a check is made as to whether the idle controller 15 supplies a significant closure signal $S_{LL}$ for the idle actuating element 16 at the output 15*a* (step 103); that is, a closure signal $S_{LL}$ which exceeds the amount for usual control fluctuations. In the event that such a closure signal does not occur, then it follows that the tank-venting valve could not have opened (step 104) and therefore a fault is present in the tank-venting system.

If in contrast, the required signal occurs at step 103, then the tank-venting valve was actually opened and an adequate operating capability of the tank-venting chain can be presumed (109).

If the inquiry at step 102 provides that the actual air number is unequal to $\lambda_0$ then there are two possibilities which must be distinguished in step 105.

If an enrichment is present, then the lambda control causes the mixture to become lean (leaning) in step 106 which becomes manifest via a significant change of the signal $S_{KS}$ of the electronic control unit 11 at the output 11*a* in such a manner that the fuel quantity to be injected per cylinder charge is reduced. The described change of the signals (100*a*, 106*a*) is evaluated and the conclusion is drawn as to the functional operability of the tank-venting system.

If the regenerating gas flow is only slightly charged with fuel, then step 105 shows that the mixture is becoming lean and the lambda control provides in step 107 a mixture enrichment via a significant change of the signal $S_{KS}$ in step 107*a* which leads to an increase of the quantity of the air/fuel mixture drawn in by the engine and having the ratio $\lambda_0$ and which leads to an increase in engine speed associated therewith. Thereafter, the idle controller becomes active and controls the position of the idle air flap via a closure signal $S_{LL}$ at the output 15*a* such that the engine operates with the desired idle speed (108).

The operability of the tank-venting system can also be concluded from an evaluation of the signals $S_{KS}$ and $S_{LL}$.

To summarize, the operation of the first embodiment of the diagnostic method according to the invention can be described as follows. The following are monitored: the output signal $S_{DB}$ of the diagnostic block 24 to the tank-venting control unit 19; the air/fuel mixture ratio $\lambda$; the position signal $S_{LL}$ for the idle actuator 16 by means of the idle controller 15; the control signal $S_{KS}$ for the metering of fuel by means of the electronic control unit 11.

The diagnostic block provides a possibility of checking whether the required preconditions, namely idle operation and operability of the idle control, are fulfilled. Only when this is the case, can the output signal $S_{DB}$ be emitted and in this way the following truth table results wherein the air/fuel ratio of the regenerating gas flow is identified by $\lambda_{TE}$.

| $S_{DB}$ present | $\lambda = \lambda_0$ | $\Delta S_{KS}$ present | $\Delta S_{LL}$ present | TEV | $\lambda_{TE}$ |
|---|---|---|---|---|---|
| yes | yes | no | no | defective | |
| yes | yes | no | yes | O.K. | $\lambda_{TE} = \lambda_0$ |
| yes | no | yes | (yes)* | O.K. | $\lambda_{TE} < \lambda_0$ |
| yes | no | yes | yes | O.K. | $\lambda_{TE} > \lambda_0$ |

wherein:
$S_{DB}$ is the output signal of the diagnostic block from the lambda probe and the air number determined by the measuring unit assigned thereto;
$S_{LL}$ is the actuating signal of the idle actuating element from the idle controller;
$S_{KS}$ is the control signal for the metering of fuel from the electronic control unit;
*when $\lambda_{TE} < \lambda_0$, $\Delta S_{LL}$ can only be measured when $\lambda_{TE}$ deviates only slightly from $\lambda_0$.

In one alternative, it is possible that in the steps 106 and 109, the compensating signal of the lambda control is evaluated. This can take place in addition to the evaluation at step 106*a* or 107*a*, 108 or in lieu thereof.

In the further operating sequence, there is no difference to the first solution.

A further embodiment of the diagnostic method also permits a check of the idle control in addition to the check of the tank-venting unit.

Figure 3:
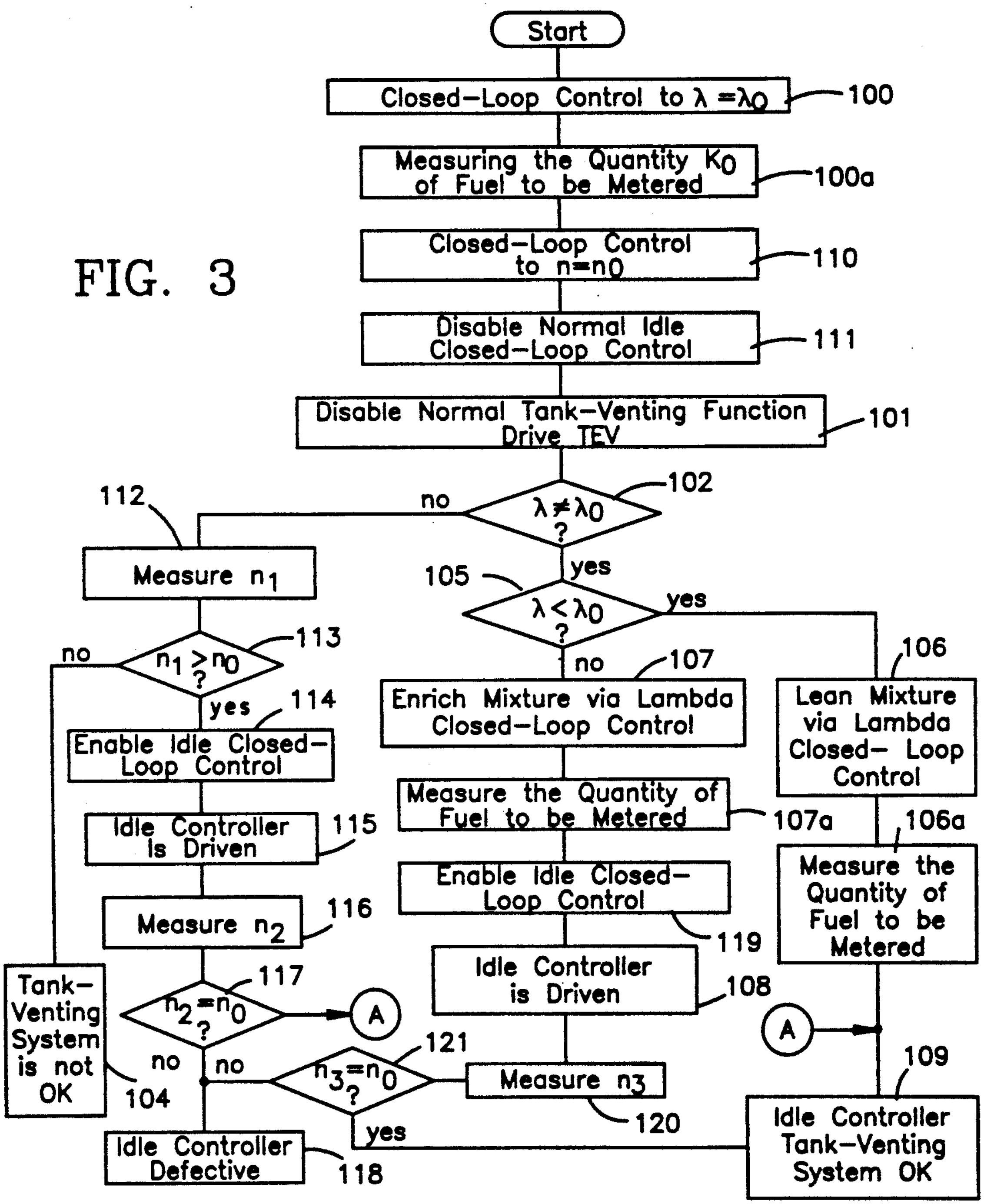

The operational sequence is shown in FIG. 3 with respect to a flowchart. This flowchart includes steps which correspond to the embodiment of FIG. 2 and are identified precisely as they are identified there.

After the control of the air/fuel ratio in correspondence to $\lambda_0$ in step 100 and the measurement of the fuel quantity to be metered for each work stroke (100*a*), the control of the engine speed takes place to the normal idle engine speed $n_0$ via the idle control 110. Thereafter, the idle control is switched off (111).

After switching off the normal tank-venting function and opening the tank-venting valve (101), the inquiry takes place as to whether a deviation $\lambda$ from $\lambda_0$ is present or not (102).

If this is not the case, then the engine speed $n_1$ is measured at step 112 and compared to $n_0$ in step 113. If $n_1$ is not significantly greater, that is within a usual fluctuation, then a defect is present in the tank-venting system (104). If $n_1$ is however significantly greater than $n_0$, then the normal idle control is switched on (114). Then a functionally operating idle control controls such that the idle controller is so closed (115) that $n_0$ is adjusted. After measuring $n_2$ (116) an inquiry takes place at step 117 as to whether this is the case. If not, the idle control must be defective. If $n = n_0$, the tank-venting system as well as the idle control is in order (109).

The steps 102, 105, 106, 106*a*, 107 and 107*a* run as in the first embodiment.

After switching on the normal idle control (119) and driving the idle controller (108), the speed $n_3$ is measured in step 120 and thereafter compared to $n_0$ (121).

For a defective idle control, n is unequal to $n_0$ (118); whereas a functionally operable idle control controls the engine speed so that $n_3$ is equal to $n_0$.

It should still be mentioned that for all embodiments, in lieu of the output signals $S_{DB}$, $S_{LL}$ and $S_{KS}$ also signals corresponding to these signals can be evaluated. This can be utilized especially when the electronic control units (11, 15, 19 and 24), which are shown separately in FIG. 1 for clarity, are integrated into a central electronic control unit.

We claim:

1. A diagnostic method for checking actuating elements of the closed-loop and/or open-loop control of operating parameters in combination with the idle control and the tank venting for an internal combustion engine having an electronic control unit which receives signals from an air-flow sensor, an engine-speed sensor and a lambda probe, and which the aid of said signals, computes open-loop control variables for at least the tank-venting valve (TEV), the idle air and the fuel metering and supplies regenerating gas flows via an appropriate drive of the tank-venting valve during the operation of the engine, drawing a conclusion as to the operating reliability of the control chain corresponding to the TEV and the idle control with the aid of comparison of variables computed by the electronic control unit to pregiven values, the method comprising the steps of:

supplying the internal combustion engine with an additional air/fuel mixture having an air/fuel ratio which can be equal to the value $\lambda_0$ at which the internal combustion engine usually operates or which can lie below or above said value $\lambda_0$;

drawing a first conclusion as to a fault condition of the tank-venting system when, after applying an opening signal $S_{DB}$ for the tank-venting valve, provided that a significant change of a signal $\lambda$ determined by the lambda probe and the measuring device corresponding to the lambda probe does not take place and that no significant change takes place of a signal $S_{LL}$ caused by the operating idle control; and, if, after the control signal $S_{DB}$ is applied, a change of the measuring signal λ and a change of the mixture caused thereby takes place via the lambda control, then drawing a second conclusion that the tank-venting valve has opened by evaluating a signal causing this leaning of the mixture.

2. The diagnostic method of claim 1, wherein a further conclusion is drawn from said second conclusion that the air/fuel ratio of the regenerating flow lies below $\lambda_0$.

3. The diagnostic method of claim 1, wherein, if, after the control signal $S_{DB}$ is applied, an increase of the measurement signal λ takes place and a mixture enrichment caused thereby takes place via the lambda control, which leads to an additional air/fuel quantity having the air/fuel ratio $\lambda_0$ and in this way to a possible increase in engine speed, which however is compensated by an operationally reliable idle control, a conclusion is drawn that the tank-venting valve has opened from an evaluation of a signal causing this compensation.

4. The diagnostic method of claim 3, wherein the conclusion is also drawn that the air/fuel ratio of the regenerating flow is above $\lambda_0$.

5. The diagnostic method of claim 1, wherein a conclusion is drawn as to a fault of the idle control, if, after switching off the normal function of the idle controller and the opening signal $S_{DB}$ is applied, no mixture enrichment of the air/fuel mixture supplied to the engine occurs, that is no reduction of the signal λ takes place, but an increase in engine speed occurs, which however is not compensated after switching on the normal function of the idle control which takes place from a comparison of the particular signals emitted by the engine-speed sensor.

6. The diagnostic method of claim 1, wherein the pregiven values necessary for the comparison are stored in a memory and/or computed.

7. An arrangement for carrying out a diagnostic method on an internal combustion engine equipped with a lambda control and a fuel tank having a tank-venting valve arranged in a conduit communicating with the air intake of the engine, the engine further being equipped with an idle air controller for controlling an idle air flap, the arrangement comprising:

first circular means for supplying a first signal indicative of the air/fuel ratio of the air/fuel mixture supplied to the internal combustion engine;

second circuit means for supplying a second signal $S_{KS}$ related to a signal supplied by the lambda control which is indicative of the fuel metered to the engine for leaning or enriching said mixture;

third circuit means for supplying a third signal $S_{LL}$ from the idle air controller which is indicative of the adjustment of the air flap for adjusting the idle air;

sensor means for supplying a fourth signal indicative of the speed of the engine;

tank-venting control means for driving the tank-venting valve to supply the air intake of the engine with an additional air/fuel mixture having an air/fuel ratio which can be equal to the value $\lambda_0$ at which the internal combustion engine usually operates or which can lie below or above $\lambda_0$; and, diagnostic means for comparing the values of said signals at predetermined time intervals and for issuing a control signal $S_{DB}$ to said tank-venting control means for opening the tank-venting valve and initiating a diagnostic method wherein;

a first conclusion is drawn as to a fault condition of the tank-venting system, after applying said control signal $S_{DB}$ for the tank-venting valve, provided that a significant change of said second signal does not take place and that no significant change takes place in said third signal $S_{LL}$; and, if, after the control signal $S_{DB}$ is applied, a change of said second signal and a change of the mixture associated therewith takes place via the lambda control, then drawing a second conclusion that the tank-venting valve has opened by evaluating a signal causing this leaning of the mixture.

8. The arrangement of claim 7, comprising means for displaying at least one result of the above-mentioned comparisons and/or for storing the result.

* * * * *

UNITED STATES PATENT AND TRADEMARK OFFICE
CERTIFICATE OF CORRECTION

PATENT NO. : 5,243,853

DATED : September 14, 1993

INVENTOR(S) : Ulrich Steinbrenner, Helmut Denz, Günther Plapp, Ulrich Mayer, Wolfgang Wagner and Stephan Höhne

It is certified that error appears in the above-identified patent and that said Letters Patent is hereby corrected as shown below:

In column 1, line 10: delete "closed-lop" and substitute -- closed-loop -- therefor.

In column 1, line 13: delete "electronics" and substitute -- electronic -- therefor.

In column 1, line 20: between "drive" and "In", insert -- . --.

In column 3, line 8: after "elements", insert -- . --.

In column 4, line 40: delete "k" and substitute -- $k_0$ -- therefor.

In column 6, line 25: delete "$n = n_0$" and substitute -- $n_2 = n_0$ -- therefor.

In column 6, line 32: delete "n" and substitute -- $n_3$ -- therefor.

In column 6, line 49: between "which" and "the", insert -- , with --.

UNITED STATES PATENT AND TRADEMARK OFFICE
CERTIFICATE OF CORRECTION

PATENT NO. : 5,243,853

DATED : September 14, 1993

INVENTOR(S) : Ulrich Steinbrenner, Helmut Denz, Günther Plapp, Ulrich Mayer, Wolfgang Wagner and Stephan Höhne It is certified that error appears in the above-identified patent and that said Letters Patent is hereby corrected as shown below:

In column 8, line 5: delete "circular" and substitute -- circuit -- therefor.

In column 8, line 16: between "signal" and "indicative", insert -- (n) --.

In column 8, line 28: delete ";" and substitute -- : -- therefor.

Signed and Sealed this

Twenty-sixth Day of April, 1994

*Attest:*

BRUCE LEHMAN

*Attesting Officer* *Commissioner of Patents and Trademarks*